United States Patent Office 2,948,672
Patented Aug. 9, 1960

2,948,672

IMPREGNATED PLATINUM-ALUMINA CATALYSTS FOR USE IN THE HYDROFORMING OF HYDROCARBONS

Harry M. Brennan, Hammond, Ind., assignor to Standard Oil Company, Chicago, Ill., a corporation of Indiana No Drawing. Filed Nov. 29, 1955, Ser. No. 549,875

9 Claims. (Cl. 208—139)

My invention relates to the conversion of hydrocarbons. More particularly, it relates to the hydroforming of petroleum naphthas and to an improved catalyst for use therein.

Within recent years, a continuing demand for motor fuels of improved octane rating has brought about a number of important changes in the technology of petroleum refining. Among the more important developments has been an improved catalytic hydroforming process, employing around 0.05 to 1 percent by weight of platinum supported on alumina as the catalyst. The process is ordinarily operated at a temperature between about 850 and 1000° F., a pressure between about 50 and 1000 pounds per square inch gage, a charging-stock hourly weight space velocity between about 0.5 and 10, and a hydrogen rate of about 2,000 to 10,000 standard cubic feet per barrel of charging stock. Under these conditions, a catalyst containing 0.6 per cent by weight of platinum, based on dry $Al_2O_3$, is initially capable of upgrading a 50 CFR-R octane number naphthenic naphtha into a stabilized 10-pound Reid 400° F. end-point gasoline of 90 CFR-R octane number or better in a yield of 90 percent by volume. This represents a remarkable advance over the processes and catalysts of the prior art, as exemplified by processes employing molybdena-alumina, chromia-alumina, and the like.

A major problem in the preparation of platinum-alumina catalysts, especially catalysts prepared by impregnation of solid, particulate alumina, has been the achievement of a uniform distribution of the platinum within the alumina structure. Such a distribution is desirable in order to expose as great an area of platinum surfaces as possible, to make fullest use of the alumina supporting material, and to protect the platinum against loss by attrition, which would tend to be emphasized if the active metal where concentrated on the outer surface of the alumina. The prior-art impregnation techniques are only partially effective in accomplishing this result. Impregnation of solid alumina with aqueous chloroplatinic acid solution deposits the platinum compound largely in the outer region of the alumina pellets. Somewhat better results are obtained by subjecting the chloroplatinic acid solution to a preliminary treatment with hydrogen sulfide, but the resulting platinum sulfide suspension is quite unstable; and being a solid suspension, it has inherent shortcomings as an impregnating medium.

I have now discovered an improved technique for effecting a uniform distribution of platinum throughout solid, hydrous alumina of limited water content and for simultaneously obtaining a platinum-alumina catalyst of greatly improved activity and other properties. My invention involves the impregnation of solid alumina containing from about 1 to 30 percent by weight of combined water, anhydrous basis, with a solution of a platinum compound in the presence of a halogen-containing aliphatic carboxylic acid having an ionization constant greater than about $10^{-2}$ at 25° C. In practicing the invention, I deposit in said alumina, before or during the addition of platinum thereto, a quantity of an acid of said class in the proportion of about 0.001 to 0.02 mole per mole of anhydrous $Al_2O_3$.

It is an object of my invention to improve the conversion of hydrocarbons. Another object is to increase the hydroforming activity of platinum-alumina catalysts. A further object is to improve the distribution of platinum in platinum-alumina catalysts. A further object is to improve the activity of platinum hydroforming catalysts, calculated in terms of their platinum content. A further object is to extend the effectiveness and utility of platinum-alumina hydroforming catalysts. Other objects will be apparent from the following description.

The alumina suitable for use in connection with my invention may be described as solid, hydrous alumina, or alumina of the xerogel type, containing from about 1 to 30 percent by weight of combined water, anhydrous basis, preferably from about 1 to 20 percent, and optimally between about 1 and 10 percent. It can be prepared by drying and/or calcining alumina gels or sols, specifically alumina hydrogels, hydrosols, ultragels, or the like, at temperatures of about 400 to 1300° F., preferably about 800 to 1200° F., for periods of 1 to 24 hours or longer to the desired water content, whereby the alumina is converted in major part into the monohydrate or to a lower state of hydration. For example, alumina hydrogel is precipitated from an aluminum salt solution by addition of alkali, and is thereafter washed to remove impurities therefrom, and dried. As another example, a Heard-type alumina hydrosol, prepared as described in Reissue Patent 22,196 (October 6, 1942), is gelled, dried, and calcined. As a further alternative, an aluminum alkoxide is hydrolyzed and the resulting alumina gel is separated and dried. Various other alternative techniques will be apparent to those skilled in the art. In all cases, the product alumina is a solid, porous material of considerable surface activity, and retains at least a small proportion of water, around 1 percent or more, within the gel lattice. The alumina should be substantially free from deleterious impurities, such as alkali metals, manganese, molybdenum, iron, cobalt, nickel, and the like, and should preferably contain 99.99 percent or more of $Al_2O_3$, dry basis, exclusive of catalytically inert substances. At an appropriate point in my process, either before or after the alumina is commingled with platinum and halogenated aliphatic carboxylic acid, the alumina or catalyst composite based thereon is formed into physical shapes adapted to the conversion process for which the catalyst is intended. For this purpose, the techniques and conditions employed in the prior art are satisfactory.

The advantageous results of my invention can be achieved in a variety of ways. I may, for example, prepare solid, hydrous alumina of the hereinabove defined type in the form of a powder, microspheres, spheres, pills, pellets, saddles, Raschig rings, rosettes, irregular grains, or the like by any of the techniques known to the art, and incorporate an aqueous solution of a water-soluble platinum compound and a halogen-substituted aliphatic carboxylic acid of the defined class therein by impregnation. For this purpose, I may use chloroplatinic acid, bromoplatinic acid, platinum tetrachloride, platinum dichloride, or the like, in a quantity sufficient to produce a completed catalyst composition containing between about 0.05 and 1 percent by weight of platinum, based on dry $Al_2O_3$. The quantities of added platinum and halogenated acid may conveniently be controlled by effecting the addition thereof through imbibition—i.e., by carrying out the impregnation with an aqueous solution of such concentration and volume that it is entirely absorbed in the catalyst particles and the catalyst particles are substantially saturated thereby. To produce this effect, it is ordinarily satisfactory to use between about 75 and 80 grams of solution per 100 grams of alumina. Alternatively, the alumina may be impregnated successively with aqueous acid solution and aqueous platinum-containing solution. In another alternative, the alumina may be impregnated with aqueous acid solution, after which the mixture is dried and/or calcined, suitably at a temperature of about 200 to 400° F. or higher for a period of 1 to 24 hours, and is then impregnated with an aqueous platinum-containing solution. In a further alternative, solid, finely divided hydrous alumina is commingled with a solid, finely divided acid of the defined class, and the resulting mixture is impregnated with platinum solution. The alumina-acid mixture may be pelleted or otherwise converted into the desired physical form either before or after addition of the platinum. In all cases, the completed catalytic mixture may suitably be dried at a temperature between about 200 and 400° F. for about 1 to 24 hours, and is then calcined, ordinarily in air, at a temperature between about 800 and 1200° F., preferably around 1100° F. for a period of 1 to 24 hours. The catalyst can thereafter be subjected to treatment with a hydrogen-containing gas at a temperature within the hydroforming range, i.e., between about 850 and 1000° F., which treatment may conveniently be effected as a part of the hydroforming operation itself.

The mechanism whereby my invention produces its advantageous results is obscure. I suggest that it may function by decreasing or modifying the adsorptive capacity of the alumina centers for the platinum compound and/or by forming a compound or complex of platinum and halogenated acid (or aluminum salt thereof) having a modified affinity for alumina. The advantageous results are not due simply to the carboxylic acid group or groups, since only a limited class of carboxylic acids are operative; and they are not due simply to the presence of halogen in the carboxylic acid molecule, since only a limited class of halogenated carboxylic acids are operative. Moreover, my new technique is effective only with solid, hydrous alumina of restricted water content. The technique is remarkably effective, being capable of producing a 0.6 percent platinum-on-alumina catalyst which has an initial activity of the order of 150 to 250, relative to a standard 0.6 percent platinum-on-alumina catalyst having an arbitrarily assigned activity of 100.

Acids suitable for use in my invention are the class of halogen-substituted aliphatic carboxylic acids having from two to 5 carbon atoms in the molecule and having at least one acidic hydrogen with an ionization constant greater than about $10^{-2}$ at 25° C., which class includes acids wherein non-acidic hydrogen atoms have been replaced by fluorine, chlorine, bromine, and/or iodine. Among these acids are certain polyhaloalkanoic acids, in particular the $\alpha,\alpha$-dihaloalkanoic acids, such as dichloroacetic, dibromoacetic, $\alpha,\alpha$-dichloropropionic, $\alpha,\alpha,\beta$-trichloropropionic, $\alpha,\alpha,\beta,\beta$-tetrachloropropionic, and $\alpha,\alpha,\beta$-trichloro-n-butyric acid and the like. I prefer to use the perhaloalkanoic acids such as pentachloropropionic, heptabromo-n-butyric, heptafluoro-isobutyric, and nonachlorovaleric acids and the like, and in particular the perhaloacetic acids, specifically trichloroacetic, tribromoacetic, trifluoroacetic, and triiodoacetic acids. Other suitable acids include dichloromalonic, $\alpha,\alpha$-dichlorosuccinic, $\alpha,\alpha'$-dichlorosuccinic, and $\alpha,\alpha$-dibromoglutaric acid, and the like. The acid can be used in the form of a finely divided powder, in cases where it normally exists as a solid and where the technique of dry-mixing with alumina is employed. Preferably, it is used in the form of an aqueous solution where impregnation or imbibition is employed. Such solutions may include an organic solvent or a mixture thereof, such as acetone, methanol, ethanol, isopropyl alcohol, or the like, or other wetting agents, such as ammonium benzenesulfonate, a polyethylene glycol, a glycol ether, or the like. The concentration of such organic solvents in the solvent mixture may range up to the saturation point or to the point of incompatibility; and in the case of difficultly soluble halogenated acids, it may be desirable to employ a non-aqueous solvent, suitably one of the group noted above. The concentration of halogenated carboxylic acid may suitably range upward from about 0.01 M, the exact concentration employed being determined by the quantity of halogenated carboxylic acid to be added to the alumina. Concentrations between about 0.01 M and 0.3 M are conveniently employed in connection with the imbibition technique described above. Some degree of improvement in catalytic properties is produced even when very small quantities of halogenated carboxylic acid are incorporated in the catalyst. It is desirable, however, to employ such acid in a molar ratio to the alumina of at least about 0.001:1, and the incremental promotional effect of the acid falls off rapidly at molar ratios about about 0.05:1. In a preferred form of the invention, I employ trichloroacetic acid in the range of about 0.1 to 10 percent by weight, based on dry $Al_2O_3$, preferably between about 0.5 and 5 percent by weight.

The treatment of alumina or alumina composites with halogenated aliphatic carboxylic acids according to various embodiments of my invention can be carried out at substantially any temperature and pressure, so long as the treating solution is maintained in the liquid phase without deleterious decomposition of the dissolved materials therein. I prefer, however, to employ ordinary pressures and ordinary temperatures within the range of about 50 to 200° F.

My invention will be more fully understood from the following specific example.

An alumina hydrosol was prepared according to the technique of Heard, described in Reissue Patent 22,196 (October 6, 1942), by amalgamating a quantity of 99.99 percent aluminum metal and reacting the amalgamated aluminum with hot aqueous 2 percent acetic acid. The resulting hydrosol was dried in an oven at 200 to 300° F. and calcined 3 hours at 950° F. The dried cake was crushed, mixed with 4 percent Sterotex as a lubricant, formed into 1/8" x 1/8" cylindrical pills, and calcined six hours at 1100° F.

The alumina pills were impregnated with platinum in the following manner. An impregnating solution was prepared by dissolving 1.5 grams of chloroplatinic acid hydrate (0.6 gram of platinum) and 3 grams of trichloroacetic acid in 100 milliliters of water. The impregnating solution was poured over 100 grams of the alumina pills in a Pyrex tray. All of the solution was absorbed by the pills, and the quantity of solution was sufficient to substantially saturate the pills. The pills were dried overnight in the tray at 220° F., and were then calcined in stainless-steel wire baskets for 6 hours at 1100° F. The completed catalyst contained 0.6 percent by weight of platinum, based on dry $Al_2O_3$, uniformly distributed throughout the pills.

A portion of the catalyst was tested in the reforming of a Mid-Continent virgin naphtha having the following inspections:

Boiling range, ASTM, ° F.:
    Initial _____ 200.
    10% _____ 237.
    50% _____ 272.
    90% _____ 313.
    End point _____ 360.
Octane number, CFR–R _____ 44.
Sulfur content (lamp) _____ 0.03 wt.-percent.
Gravity, API _____ 56.5.
Reid vapor pressure _____ 1.8 p.s.i.
Bromine number _____ 1.4.
Composition:
    Naphthenes _____ 40 vol.-percent.
    Paraffins _____ 52.
    Aromatics _____ 8.

A quasi-isothermal laboratory reactor was employed for the test, comprising a tubular reaction vessel holding 50 milliliters of catalyst, surrounded by an elctrically heated metal block for temperature control. The block was maintained at a temperature of approximately 935° F., and the hydroforming reaction was carried out at a pressure of 200 pounds per square inch gage, a liquid hourly space velocity of 2, and a once-through hydrogen rate of 5,000 cubic feet per barrel of feed. Under these conditions, the reaction products emerging from the catalyst zone had a temperature of about 900° F. The products were collected at 20-hour intervals and the CFR–R octane numbers of the $C_5+$ fractions were determined. From these data the catalyst activity was calculated as the relative quantity, expressed as a percentage, of an arbitrarily chosen standard catalyst required to produce a $C_5+$ product fraction having the same octane number under the same test conditions. The results are given in the table below.

For comparison, a conventional 0.6 percent platinum catalyst of the prior-art type was prepared by commingling ammonium polysulfide with aqueous chloroplatinic acid solution and adding the clear platinum solution obtained thereby to a sufficient quantity of a Heard-type alumina hydrosol, referred to above. The catalytic mixture was gelled by adding ammonia, then dried, calcined, and subjected to a hydroforming activity test under the conditions described above. The results were as follows:

| Product Interval, hr. | Acid-Impregnated Catalyst | | Conventional Catalyst | |
|---|---|---|---|---|
| | Product Octane, CFR-R | Catalyst Activity | Product Octane, CFR-R | Catalyst Activity |
| 0–20 | 100+ | 220 | 95.9 | 95 |
| 20–40 | 100+ | 212 | 95.3 | 87 |
| 40–60 | 99 | 167 | 95.0 | 83 |
| 60–80 | 97.8 | 133 | 94.8 | 81 |
| 80–100 | 97.4 | 124 | 94.7 | 79 |
| 100–120 | 97.2 | 119 | 94.6 | 77 |
| 120–140 | 96.3 | 103 | | |
| 140–160 | 96.6 | 108 | | |

From the results of the foregoing tests, it is apparent that my new type of catalyst exhibits an activity of a different order of magnitude from that of conventional platinum-alumina catalysts.

My improved catalysts are broadly useful in hydrocarbon-conversion reactions which are catalyzed by platinum. Specifically, my catalysts are useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art, as set forth above. My catalysts are especially advantageous in the hydroforming of petroleum naphthas boiling in the range of about 200–400° F., and are capable of upgrading a 50 percent naphthenic naphtha having a CFR–R octane number of only 40 to 50 into a $C_5+$ gasoline having an octane number of 90 to 100 in a yield of 80 to 85 percent.

While I have described my invention with reference to certain specific embodiments thereof, it should be understood that such embodiments are illustrative only and not by way of limitation. Various modifications of my invention and alternative operating procedures and conditions will be apparent from the foregoing description to those skilled in the art.

In accordance with the foregoing description, I claim as my invention:

1. A method for preparing an alumina-based hydroforming catalyst of improved activity having platinum uniformly distributed therein, which comprises impregnating solid, hydrous alumina containing between about 1 and 30 percent by weight of combined water, dry basis, with a solution of a platinum compound in a quantity whereby platinum is added thereto in a proportion between about 0.05 and 1 percent by weight, based on dry $Al_2O_3$, and drying and calcining the resulting catalytic mixture, said impregnation being carried out in the presence of an aqueous solution of a halogen-containing aliphatic carboxylic acid having from 2 to 5 carbon atoms in the molecule and an ionization constant greater than about $10^{-2}$ at 25° C. in a molar ratio to alumina between about 0.001 and 0.05.

2. The method of claim 1 wherein said acid is a polyhaloalkanoic acid.

3. The method of claim 1 wherein said acid is a perhaloacetic acid.

4. A method for preparing a platinum-on-alumina hydroforming catalyst of improved activity and of uniform platinum distribution, which comprises impregnating solid, hydrous alumina containing between about 1 and 20 percent by weight of combined water, dry basis, with an aqueous solution of chloroplatinic acid and a polyhaloacetic acid, the proportion of said polyhaloacetic acid being between about 0.1 and 10 percent by weight, based on dry $Al_2O_3$, and the quantity of platinum in said chloroplatinic acid being equivalent to between about 0.05 and 1 percent by weight of said alumina, dry basis, and drying and calcining the resulting mixture.

5. The method of claim 4 wherein said acid is dichloroacetic acid.

6. The method of claim 4 wherein said acid is trichloroacetic acid.

7. A hydrocarbon conversion process which comprises contacting a hydrocarbon charging stock under conversion conditions with a platinum-alumina hydroforming catalyst of improved activity having between about 0.05 and 1 percent by weight of platinum, based on dry $Al_2O_3$, uniformly distributed therein, prepared by impregnating solid, hydrous alumina containing between about 1 and 30 percent by weight of combined water, dry basis, with a solution of a platinum compound in a quantity whereby platinum is added thereto in a proportion within said range, and drying and calcining the resulting catalytic mixture, said impregnation being carried out in the presence of an aqueous solution of a halogen-containing aliphatic carboxylic acid having from 2 to 5 carbon atoms in the molecule and an ionization constant greater than about $10^{-2}$ at 25° C. in a molar ratio to alumina between about 0.001 and 0.05.

8. The process of claim 7 wherein said acid is a polyhaloalkanoic acid.

9. The process of claim 7 wherein said acid is a perhaloacetic acid.

References Cited in the file of this patent

UNITED STATES PATENTS

| | | |
|---|---|---|
| 2,479,109 | Haensel | Aug. 16, 1949 |
| 2,642,384 | Cox | Jan. 16, 1953 |
| 2,723,947 | Oblad et al. | Nov. 15, 1955 |
| 2,746,937 | Hunter et al. | May 22, 1956 |
| 2,840,514 | Brenner et al. | June 24, 1958 |